United States Patent [19]
Gale et al.

[11] 3,885,626
[45] May 27, 1975

[54] OIL RECOVERY PROCESS UTILIZING HIGHER ALKYL TOLUENE SULFONATE

[75] Inventors: Walter W. Gale, Houston; Thomas L. Ashcraft, Jr.; Rhoderick K. Saunders, both of Baytown, all of Tex.

[73] Assignee: Exxon Production Research Company, Houston, Tex.

[22] Filed: Jan. 2, 1974

[21] Appl. No.: 430,338

[52] U.S. Cl. .................................. 166/273; 166/274
[51] Int. Cl. ............................................ E21b 43/22
[58] Field of Search .......................... 166/273–274, 166/305 R; 252/8.55 D

[56] References Cited
UNITED STATES PATENTS

| | | | |
|---|---|---|---|
| 3,251,412 | 5/1966 | Cooke, Jr. et al. | 166/275 |
| 3,605,891 | 9/1971 | Ayers, Jr. | 166/273 |
| 3,799,263 | 3/1974 | Prillieux et al. | 166/275 |

*Primary Examiner*—Stephen J. Novosad
*Attorney, Agent, or Firm*—Lewis H. Eatherton

[57] ABSTRACT

Crude oil is recovered by injecting into a subterranean formation an aqueous surfactant solution wherein the surfactant is a higher alkyl toluene sulfonate, preferably octadecyl toluene sulfonate.

19 Claims, No Drawings

OIL RECOVERY PROCESS UTILIZING HIGHER ALKYL TOLUENE SULFONATE

BACKGROUND OF THE INVENTION

This invention relates to the recovery of oil from a subterranean formation; more specifically this invention relates to the recovery of oil from a subterranean formation through the use of an aqueous surfactant solution, the surfactant being a higher alkyl toluene sulfonate, preferably octadecyl toluene sulfonate.

The crude oil which is accumulated in subterranean formations is recovered or produced therefrom through one or more wells drilled into the subterranean formation with the initial production of the crude oil being carried out by what is referred to as "primary recovery," i.e. where only initial formation energy is used to recover the crude oil. However, the primary recovery technique leaves substantial quantities of crude oil in the subterranean formation. Accordingly, recognition of the large amount of residual crude oil remaining in such reservoirs has led to the use of so-called "secondary and tertiary recovery" techniques with the primary purpose of economically recovering additional quantities of oil after primary depletion.

Probably one of the most common secondary recovery methods is the so-called "waterflooding" technique in which aqueous fluids are injected at one point or more points in the reservoir at pressures sufficient to be forced out into the reservoir and toward a spaced production well or wells so as to effect a displacement of the oil from the pores of the reservoir and a driving of oil ahead of the water front to the production well or wells.

As can be easily understood waterflooding and similar secondary recovery techniques are only advantageous when the cost of the water and any additional necessary chemical modifiers are less than the value of the oil which is recovered after primary depletion. Accordingly, the displacement efficiency of the waterflood and similar techniques has been a determining factor in whether such techniques can be satisfactorily utilized in oil recovery.

The displacement efficiency of the water itself is relatively poor primarily due to the formation of discontinuous oil droplets as the waterflood proceeds. There is a relatively high interfacial tension between the water and the oil which contributes to the capillary retention of the discontinuous oil and thereby prevents its displacement by water under pressure gradients feasible in reservoir flooding processes. The displacement efficiency decreases with increasing interfacial tension thereby making recovery of oil quite difficult.

As a result of the foregoing, various aqueous surfactant systems have been proposed for use in waterflooding processes for recovering oil. Thus, it has been proposed that the interfacial tension between the oil and water can be reduced from a characteristic value of approximating 35 dynes per centimeter to a value of less than one dyne per centimeter with the proper selection of a surfactant or surfactants. The selection of a particular surfactant, however, depends not only upon the ability of the surfactant to reduce the oil/water interfacial tension but in addition the cost of the surfactant, since in any secondary or tertiary recovery technique the cost of the materials utilized must be significantly less than the value of the oil which can be recovered.

Not only are surfactants utilized in secondary recovery techniques such as waterflooding but, in addition, aqueous surfactant solutions are employed in tertiary recovery techniques utilized to recover residual oil from a "watered-out" reservoir. In such uses a slug of surfactant is followed by a driving fluid to drive the slug of aqueous surfactant through the reservoir so as to allow displacement of the residual oil trapped in the pores of the reservoir. Here again the surfactant must be selected not only based on its ability to reduce the oil/water interfacial tension and thus allow for effective displacement of the oil but, in addition, the selection of a particular surfactant which can be utilized in these tertiary recovery techniques is based upon economic considerations.

SUMMARY OF THE INVENTION

The present invention provides an improved aqueous surfactant solutions which can be adapted for secondary or tertiary recovery of oil in all flooding techniques wherein aqueous surfactant solutions are conventionally employed. The present invention provides an improved aqueous surfactant system which allows for the effective reduction of the interfacial tension between the oil and water while allowing the recovery of the oil in an economic manner. These characteristics of the present invention are associated with the use of a higher alkyl toluene sulfonate, preferably octadecyl toluene sulfonate, as the effective surfactant.

Accordingly, it is a principal object of the present invention to provide an aqueous surfactant solution particularly effective for recovering oil in secondary and tertiary recovery techniques.

A further object of the present invention is to provide a process for recovering crude oil by utilizing an aqueous surfactant solution including as the surfactant a higher alkyl toluene sulfonate.

A still further object of the present invention comprises a tertiary residual oil recovery technique of introducing into a watered-out reservoir a flood of an aqueous surfactant solution of a higher alkyl toluene sulfonate, preferably octadecyl toluene sulfonate, followed by injection of a driving fluid.

Still further objects and advantages of the method of the present invention will become more apparent from the following more detailed description thereof.

DESCRIPTION OF THE PREFERRED EMBODIMENT

The foregoing objects and advantages of the present invention are achieved through the use of an aqueous surfactant solution wherein the surfactant comprises a higher alkyl toluene sulfonate. In this regard it has been discovered in accordance with the present invention that when such surfactant is utilized in the recovery of crude oil, whether a secondary recovery process or tertiary recovery subsequent to waterflooding, the higher alkyl toluene sulfonate is effective in reducing the interfacial tension between the oil and water, thereby allowing effective displacement and recovery of the crude oil within a subterranean formation with minimum cost. Accordingly, the use of the specific surfactant of the present invention allows economic secondary and/or tertiary recovery of crude oil from subterranean formations.

The higher alkyl toluene sulfonate utilized in accordance with the present invention is a material obtained by the alkylation of toluene and subsequent sulfonation of the alkylate. The salt is formed by reacting the sulfonic acid of the alkylated toluene with a suitable salt-forming material. The higher alkyl group attached to the toluene can be in the ortho-, meta- or para-position and is preferably an alkyl group of from about 12 to about 20 carbon atoms, more preferably from 16 to 20 carbon atoms, including, for example, dodecyl, hexadecyl, octadecyl, eicosyl, etc., with the preferred alkylate being one which predominates in the octadecyl group. For example, the molecular weight distribution of a typical alkylate prior to sulfonation can be represented as follows:

| Molecular formula of alkylate | Percent appearance in alkylate |
|---|---|
| $C_{24}H_{42}$ | 31.1% |
| $C_{25}H_{44}$ | 60.8% |
| $C_{26}H_{46}$ | 7.8% |

It can be seen from this example of a typical alkylate that while the octadecyl toluene predominates in the molecular weight distribution, the molecular weight range specified above and the expression octadecyl toluene sulfonate as used throughout are meant to embrace the sulfonation products of alkylated toluenes which contain lesser amounts of alkylates below and above those specifically recited but in which the recited alkylate predominates, i.e. is present in an amount greater than any other alkylate. Also, the higher alkyl toluene sulfonate can contain one or more additional substitutents which do not interfere with its ability to effectively act as a surfactant in secondary and tertiary oil recovery including, for example, additional alkyl groups.

The surfactant employed in the method of the present invention is used in the form of a salt. The salt-forming cation can be any conventional cation employed in the formation of sulfonate surfactants for residual oil recovery, including but not limited to the basic metals, such as sodium and other alkali and alkaline earth metals, ammonium, and amine salts. particularly applicable amines are the alkanolamines including, for example $C_{1-6}$ mono-, di-, and tri-alkanolamines. Of these the monoethanolamine salts of the higher alkyl toluene sulfonic acids are particularly applicable and effective in the method of the present invention. These salts of course can be prepared by reacting the higher alkyl toluene sulfonic acid with the suitable salt-forming material base. Similarly, the sulfonic acid itself can be prepared by sulfonating the higher alkyl toluene in a conventional manner.

The aqueous surfactant system employed in the method of the present invention is generally a brine solution containing from about 0.1 to about 5 percent by weight sodium chloride. Of course, slightly lesser or greater amounts can be present in the aqueous surfactant solution where desired for particular purposes. Also, the aqueous surfactant solution, in accordance with the present invention, may contain any of the conventional water thickeners to increase the viscosity and reduce the mobility of the aqueous solution to obtain a viscosity and mobility which is favorable with respect to the fluids being displaced from the formation. Such conventional thickeners include, for example, conventional fatty acids soaps, alginates, sucrose, dextran, amines, glycerine, finely divided clay, such as montmorillonite, and high molecular weight polymers such as a microbial gum polysaccharide or a partially hydrolyzed polyarcylamide sold respectively under such names as "kelzan XC" and "Dow Pusher" manufactured respectively by Kelco Corporation and Dow Chemical Company. These materials, as well as other conventional thickeners or viscosity modifiers, can be employed in the aqueous surfactant solution in the conventional manner.

In the aqueous surfactant solution the higher alkyl toluene sulfonate is generally employed in a concentration of from about 0.5 to about 10 percent by weight based on the weight of the solution. Similarly, the aqueous surfactant solution is generally utilized in an amount of 0.01 to 2 pore volumes. Preferably, the concentration of the surfactant and the pore volume of the aqueous solution is adjusted so that the concentration of surfactant times the percentage of the pore volume bank does not exceed a value of 100. Slight deviations in this can, of course, be tolerated and are within the scope of the present invention and can be utilized where desired for particular purposes.

As indicated previously, the aqueous surfactant system utilized in the process of the present invention is particularly adapted for the recovery of residual oil from a watered-out reservoir, i.e. a reservoir which has been subjected to primary depletion and secondary waterflooding. Under such circumstances the aqueous surfactant system is introduced into the subterranean formation in the form of a slug, generally a 0.03 to 0.6 pore volume slug of the aqueous brine containing the higher alkyl toluene sulfonate with the optional presence of a thickener or viscosity modifier as described earlier. The slug is driven through the formation by means of a driving fluid and displaces the crude oil which is trapped in the formation toward a production well or wells. Generally, the slug is introduced through one or more injection wells spaced apart from but in fluid communication with the production wells, although the process of the present invention also finds applicability in those instances where a single well serves both for injection and production through the so-called "push-pull" technique. The driving fluid which drives the aqueous slug through the formation may be any typically utilized driving fluid such as thickened water or thickened brine, the driving fluid generally being one which has a viscosity and mobility similar to the slug driven through the formation. Again, it is conventional to control the viscosity and mobility of the slug so as to be similar to the contents of the formation thereby eliminating any possible adverse fingering effect when driving the slug through the subterranean formation. As was the case with regard to the thickeners or viscosity modifiers utilized in the aqueous surfactant solution, any conventionally employed thickeners or viscosity modifiers can be utilized in the production of the thickened water driving fluid.

The process of the present invention is also applicable to waterflooding techniques wherein the higher alkyl toluene sulfonate surfactant is employed in the waterflood. Here again the octadecyl toluene sulfonate acts to reduce the interfacial tension between the oil and water, thereby allowing for a more efficient displacement of the oil through the subterranean formation toward the production well. Since the higher alkyl toluene sulfonate utilized in the process of the present invention effectively reduces the interfacial tension at low cost, the process of the present invention can be carried out economically and efficiently in a manner not previously possible with conventional surfactants.

The process of the present invention will now be described by the following example, it being understood that such example is presented for purposes of illustration only and the present invention is in no way to be deemed limited thereby.

EXAMPLE

This example illustrates the effectiveness of octadecyl toluene sulfonate, monoethanolamine salt to reduce the final oil saturation of oil reserves.

Berea cores ½ × ½ inch × 1 foot containing residual Loudon oil (a crude oil from the Loudon field, Illinois) were employed in laboratory core flooding. The Berea cores containing the residual Loudon oil were contacted with a one pore volume bank of 1% octadecyl toluene sulfonate (monoethanolamine salt) solution, the solution containing 2% sodium chloride. The one pore volume bank of the saline solution was followed by a brine flood. It was found that by this procedure a final oil saturation of 5.1% pore volume was achieved.

While the present invention has been described primarily based upon the foregoing exemplification, it should be understood that the present invention is in no way to be deemed as limited thereto but, rather must be construed as broadly as all or any equivalents thereof.

We claim:

1. In a method of recovering crude oil from a subterranean formation wherein an aqueous surfactant system is injected into the formation through at least one injection means to displace crude oil in the formation toward at least one production means, the improvement wherein the surfactant of said aqueous surfactant system is a $C_{12-20}$ alkyl toluene sulfonate.

2. The method of claim 1 wherein said surfactant is octadecyl toluene sulfonate.

3. The method of claim 2 wherein said octadecyl toluene sulfonate is in the form of a monoethanolamine salt.

4. The method of claim 1 wherein said aqueous surfactant system is injected as a slug into a primary depleted and watered-out subterranean formation, followed by injection of a driving fluid.

5. The method of claim 1 wherein said $C_{12-20}$ alkyl toluene sulfonate is present in said aqueous surfactant system in an amount of about 0.5 to about 10% by weight.

6. The method of claim 1 wherein said $C_{12-20}$ alkyl toluene sulfonate is present in said slug in an amount of about 0.5 to about 10% by weight.

7. A method of recovering residual crude oil from a subterranean formation which has been subjected to primary depletion and waterflooding which comprises injecting into the watered-out formation an aqueous saline solution of a $C_{12-20}$ toluene sulfonate in an amount effective to displace and recover residual crude oil from said subterranean formation, and thereafter injecting into said formation a driving fluid to drive said aqueous saline solution through said formation.

8. The method of claim 7 wherein said surfactant is octadecyl toluene sulfonate.

9. The method of claim 8 wherein said octadecyl toluene sulfonate is in the form of a monoethanolamine salt.

10. The method of claim 7 wherein said aqueous solution of said $C_{12-20}$ alkyl toluene sulfonate is injected as a 0.03 to 0.6 PV slug.

11. The method of claim 7 wherein the $C_{12-20}$ alkyl toluene sulfonate is present in said aqueous solution in an amount of 0.5 to 10% by weight.

12. A method of recovering crude oil from a subterranean formation which comprises injecting into said formation through at least one injection means in communication with at least one production means an aqueous saline solution of a $C_{12-20}$ alkyl toluene sulfonate in an amount effective to displace crude oil in said formation toward said production means and recovering the displaced crude oil through said production means.

13. The method of claim 12 wherein said surfactant is octadecyl toluene sulfonate.

14. The method of claim 13 wherein said octadecyl toluene sulfonate is in the form of a monoethanolamine salt.

15. The method of claim 12 wherein the injection of said aqueous solution is carried out after primary depletion and waterflooding of said subterranean formation.

16. The method of claim 15 wherein said aqueous solution is injected as a slug followed by injection of a driving fluid.

17. The method of claim 16 wherein said slug is a 0.03 to 0.6 PV slug.

18. The method of claim 16 wherein said $C_{12-20}$ alkyl toluene sulfonate is present in said slug in an amount of about 0.5 to about 10% by weight.

19. The method of claim 12 wherein the $C_{12-20}$ alkyl toluene sulfonate is present in said aqueous solution in an amount of 0.5 to 10% by weight.

* * * * *